United States Patent
Hokes et al.

(10) Patent No.: US 11,267,384 B2
(45) Date of Patent: Mar. 8, 2022

(54) VEHICLE ASSEMBLY WITH GRAB BAR AND METHODS OF MAKING AND USING THE SAME

(71) Applicant: Honda Motor Co., Ltd., Tokyo (JP)

(72) Inventors: Michael J. Hokes, Dublin, OH (US); Sebastian Osorio, Columbus, OH (US); Matthew L. Taracko, Marysville, OH (US); Cody M. Lindemann, Raymond, OH (US); Jason W. Grundey, Wapakoneta, OH (US); Dane R. Marsack, Raymond, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 232 days.

(21) Appl. No.: 16/578,867

(22) Filed: Sep. 23, 2019

(65) Prior Publication Data

US 2021/0086679 A1 Mar. 25, 2021

(51) Int. Cl.
*B60N 3/02* (2006.01)

(52) U.S. Cl.
CPC .................................... *B60N 3/02* (2013.01)

(58) Field of Classification Search
CPC .......... B60N 3/026; B60N 3/023; B60N 3/02; B60N 2/78; B60N 2/24; B60N 2/4235; B60N 2/42709; B60N 2/02; B60N 2/245
USPC ....... 296/1.02, 214, 146.7, 1.08, 146.1, 153, 296/187.05, 146.8, 183.1; 280/730.2, 280/163, 728.2, 728.3, 164.1, 166, 727, 280/728.1
See application file for complete search history.

(56) References Cited

U.S. PATENT DOCUMENTS

| | | | | |
|---|---|---|---|---|
| 4,660,345 A | * | 4/1987 | Browning | B62D 21/08 164/63 |
| 5,327,989 A | * | 7/1994 | Furuhashi | B60G 3/20 180/248 |
| D498,435 S | * | 11/2004 | Saito | D12/1 |
| 8,651,525 B2 | | 2/2014 | Kaku et al. | |

(Continued)

FOREIGN PATENT DOCUMENTS

| FR | 2770183 A1 | 4/1999 |
|---|---|---|
| KR | 20030000339 A | 1/2003 |

OTHER PUBLICATIONS

"2018 Yamaha Wolverine X4 SE Recreation Side-by-Side—Model Home" https://www.yamahamotorsports.com/recreation-side-by-side/models/2018/wolverine-x4-se.

(Continued)

*Primary Examiner* — D Glenn Dayoan
*Assistant Examiner* — Sunsurraye Westbrook
(74) *Attorney, Agent, or Firm* — Kenealy Vaidya LLP (57) ABSTRACT

A vehicle assembly can include a vehicle body structure, a front seat, a rear seat, and a grab bar assembly. The vehicle body structure can define a passenger area. The front seat can be mounted to the vehicle body structure. The rear seat can be mounted to the vehicle body structure. The grab bar assembly can be mounted to the vehicle body structure. The grab bar assembly can include a grab bar, a spacer bar and a cover assembly. The grab bar can extend across the passenger area. The spacer bar can be attached to the grab bar, with a first gap formed between the spacer bar and the front seat, and a second gap formed between the spacer bar and the grab bar. The cover assembly can be attached to the spacer bar and positioned in the first gap.

20 Claims, 10 Drawing Sheets

(56) References Cited

U.S. PATENT DOCUMENTS

| | | | | |
|---|---|---|---|---|
| 8,998,283 | B1* | 4/2015 | Yamamoto | B60R 5/04 |
| | | | | 296/24.43 |
| 9,475,413 | B2 | 10/2016 | Hayashi et al. | |
| 9,616,844 | B2 | 4/2017 | Karube et al. | |
| 9,701,346 | B2 | 7/2017 | Deckard et al. | |
| 2009/0184531 | A1* | 7/2009 | Yamamura | B62D 33/02 |
| | | | | 296/37.6 |
| 2020/0207421 | A1* | 7/2020 | Osorio | B62D 25/04 |

OTHER PUBLICATIONS

"Agency Power Bolt-In Harness Bar BMW M3 E46" https://www.agencypower.com/agency-power-boltin-harness-bar-bmw-e46-p-151833564.html.

"Car Headrest Hanger Hook Security Handrail" https://www.aliexpress.com/item/Car-Headrest-Hanger-Hook-Security-Handrail-Car-Seat-Grab-Bar-Hooks-Auto-Seat-Back-Hanging-Bag/32679520503.html.

* cited by examiner

VEHICLE ASSEMBLY WITH GRAB BAR AND METHODS OF MAKING AND USING THE SAME

BACKGROUND

The disclosed subject matter relates to a vehicle assembly that includes a grab bar assembly. More particularly, the disclosed subject matter relates to a grab bar assembly that can be positioned behind a seat of a vehicle, such as a front seat of the vehicle.

A vehicle can travel along any one or combination of improved, unimproved, and unmarked paths. Some vehicles can be configured with special structures that can improve passenger comfort while traveling on unimproved or unmarked paths. Travel along an unimproved path, which can include an off-road trail, for example, can result in substantial jostling of the passengers in the vehicle. The vehicle can include one or more grab bars that can be grasped by passengers of the vehicle in order to possibly assist the passenger's comfort and stability while being jostled. That is, the grab bar can help the passenger to brace themselves to better withstand jostling of the vehicle.

SUMMARY OF THE INVENTION

Some embodiments are directed toward a vehicle assembly that can include a vehicle body structure, a front seat, a rear seat, and a grab bar assembly. The vehicle body structure can define a passenger area. The front seat can be mounted to the vehicle body structure. The rear seat can be mounted to the vehicle body structure. The grab bar assembly can be mounted to the vehicle body structure. The grab bar assembly can include a grab bar, a spacer bar and a cover assembly. The grab bar can extend across the passenger area. The spacer bar can be attached to the grab bar, with a first gap formed between the spacer bar and the front seat, and a second gap formed between the spacer bar and the grab bar. The cover assembly can be attached to the spacer bar and positioned in the first gap.

Some embodiments are directed toward a vehicle assembly for a vehicle that can include a vehicle body structure, a front seat, a rear seat, and a grab bar assembly. The vehicle body structure can define a passenger area. The front seat can be mounted to the vehicle body structure. The rear seat can be mounted to the vehicle body structure. The grab bar assembly can be mounted to the vehicle body structure. The grab bar assembly can include a grab bar, a spacer bar and a cover assembly. The grab bar can extend across the passenger area. The spacer bar can be attached to the grab bar, with a first gap formed between the spacer bar and the front seat, and a second gap formed between the spacer bar and the grab bar. The cover assembly can be attached to the spacer bar, and positioned in the first gap. The cover assembly can include at least one receiving groove and a plurality of fasteners. The at least one receiving groove can receive the spacer bar. The plurality of fasteners can attach the cover assembly to the spacer bar.

Some embodiments are directed toward a vehicle including a vehicle body structure, a front seat, a rear seat, a grab bar assembly, and a plurality of wheels. The vehicle body structure can define a passenger area. The front seat can be mounted to the vehicle body structure. The rear seat can be mounted to the vehicle body structure. The plurality of wheels can be connected to the vehicle body structure. The grab bar assembly can be mounted to the vehicle body structure. The grab bar assembly can include a grab bar, a spacer bar and a cover assembly. The grab bar that can extend across the passenger area. The spacer bar can be attached to the grab bar, with a first gap formed between the spacer bar and the front seat, and a second gap formed between the spacer bar and the grab bar. The cover assembly can be attached to the spacer bar. The cover assembly can be positioned in the first gap so as to be positioned between the front seat and the spacer bar.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Known arrangements of grab bars, as well as components associated with grab bars, have deficiencies. For example, a front seat in front of the grab bar can deflect toward the grab bar during operation of the vehicle. As a result, the front seat can come into contact with the fingers of a passenger grasping the grab bar while seated in a rear seat that is behind the front seat and the grab bar. A wire form bar can be connected to the grab bar to extend between the front seat and the grab bar and can a form a space between the wire form bar and the grab for the fingers of the rear seat passenger. As a result, the wire form bar can block the front seat before the front seat can impact the fingers of the rear seat passengers while grasping the grab bar. However, the rear seat passenger can mistakenly grasp the wire form bar instead of the grab bar. Thus, the front seat can impact the fingers of the rear seat passenger. Accordingly, it is desirable to provide a rear seat passenger with further protection against an impact between the front seat and the fingers of the rear seat passenger while grasping the grab bar.

Figure 1:
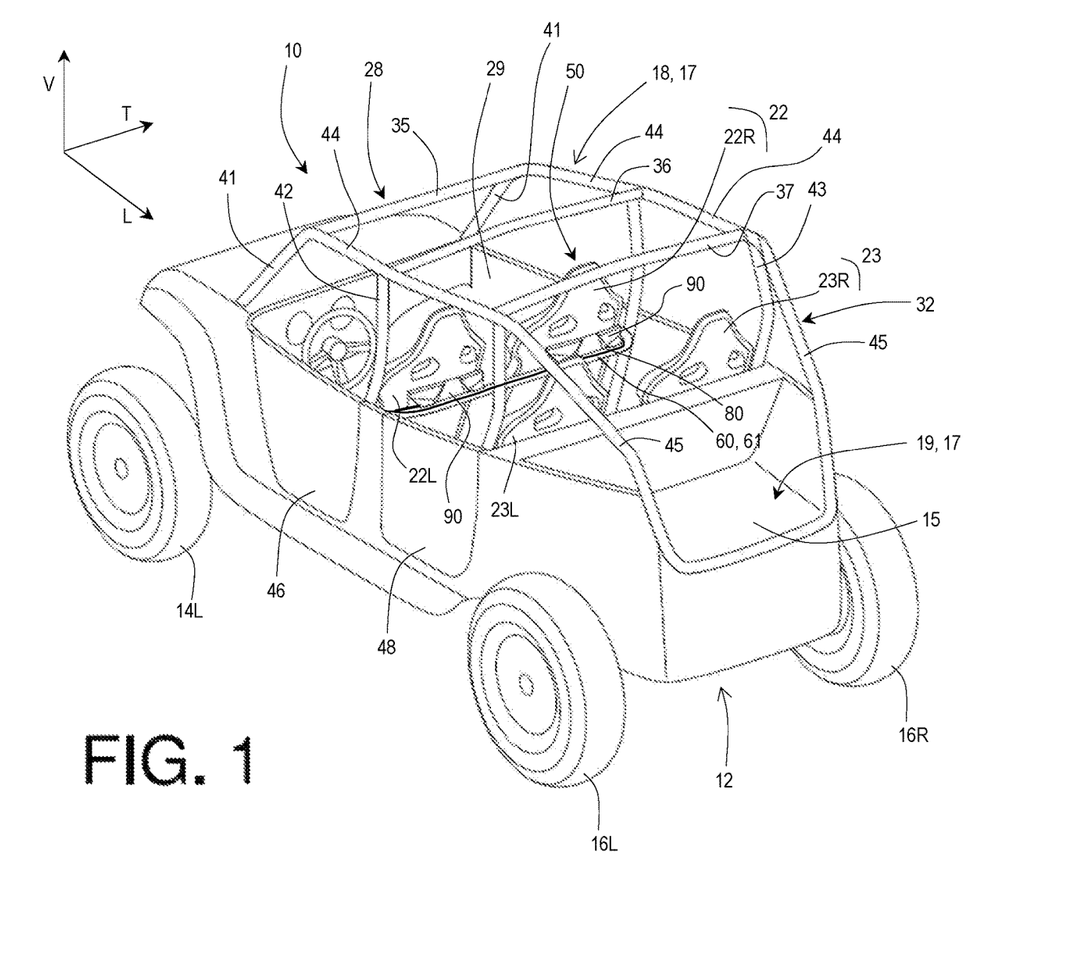
FIG. 1 is a left-rear perspective view of an exterior of a vehicle in accordance with principles of the disclosure.

A vehicle 10 is shown in FIG. 1. The vehicle 10 is specialized for use on an unimproved path or on an unmarked path, and can be referred to as a multipurpose utility vehicle (MUV) or as a side-by-side all-terrain vehicle (S×S, or S×S ATV). However, the grab bar assembly of the disclosure can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Referring to FIG. 1, the vehicle 10 can include a body 12, a pair of front wheels, 14L, 14R, a pair of rear wheels 16L, 16R, a frame assembly 18, a pair of front door assemblies 46, a pair of rear door assemblies 48, and a powertrain. Portions of the frame assembly 18 and the right front wheel 14R are hidden from view in FIG. 1 by the body 12 and the powertrain of the vehicle 10 is omitted for simplicity and clarity of the drawings.

The vehicle 10 can include a pair of front seats 22, including fronts seats 22L, 22R, and a pair of rear seats 23, including seats 23L, 23R, mounted in a passenger area 29 of the vehicle 10. The frame assembly 18 can include a roll cage 28 configured to extend around and above the seats 22L, 22R, 23L, 23R and the passenger area 29. The roll cage 28 can cooperate with the body 12 and/or at least a portion of the frame assembly 18 to define door openings through which a passenger may pass in order to enter or exit the passenger area.

The vehicle 10 can include a powertrain. The powertrain can include an internal combustion engine, one or more electric motor(s) or a hybrid of an internal combustion engine and one or more electric motor(s), or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R.

Referring to FIG. 1, the body 12 can be formed of one or more panel structures 19 mounted on the frame assembly 18. For example, the panel structure 19 can include a panel extending around each of the wheels 14L, 14R, 16L, 16R. The panel structure 19 can include one or more panels that form a cargo/storage area 15 at the rear of the vehicle 10. The powertrain can be mounted to the frame assembly 18 at a location that is underneath the cargo/storage area 15. The panel structure 19 can also include floor panels. The frame assembly 18 and/or the floor panels (of the panel structure 19) can support the seats 22L, 22R, 23L, 23R.

The frame assembly 18 can be configured to support the body 12, door assemblies 46, 48, seats 22L, 22R, 23L, 23R, suspension components for the wheels 14L, 14R, 16L, 16R, powertrain, steering system, control pedal assemblies, passengers and cargo items, for example. The frame assembly 18 can be configured to withstand various modes of operation, including operation on unimproved paths, and can be configured to surround the passenger area. The frame assembly 18 can include a main frame assembly, a front frame assembly and a rear frame assembly.

The frame assembly 18 can define the passenger area 29 of the vehicle 10. The frame assembly 18 can also provide an overall bending stiffness and torsional stiffness characteristic for the vehicle 10 that can be advantageous for rugged terrain of an unimproved path.

The frame assembly 18 can be made from any appropriate structural element(s), such as but not limited to tubes, beams, stampings, etc., that can provide sufficient strength and rigidity for the vehicle 10 including the vehicle passenger area. The frame assembly 18 can be formed from a single type of structural element, or alternatively the frame member 18 can be formed from any combination of structural elements. The structural elements can have any appropriate cross-sectional shape, such as but not limited to circular, rectangular, regular polygonal, irregular polygonal, hollow, and/or solid. The structural elements can be variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, iron, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, brackets, welding, adhesive, or any combination thereof, etc.

The frame assembly 18 can be configured to support other components such as but not limited to a radiator, a steering rack assembly, front drive assembly and a rear drive assembly.

As shown in FIG. 1, the roll cage 28 generally defines the passenger area or compartment 29. The roll cage 28 can extend in the longitudinal direction L of the vehicle 10, from the front end of the passenger area 29 to the rear end of the passenger area 29. The roll cage 28 can define the limits of the passenger area 29 in the transverse direction T of the vehicle 10, the longitudinal direction L of the vehicle 10 and in the vertical direction V of the vehicle 10. The roll cage 28 can be configured to support the door assemblies 46, 48 and any appropriate portion(s) of the body 12, such as but not limited to flexible side panel(s), rigid side panel(s), roof panel (rigid or flexible), flexible or rigid rear panel, etc.

The roll cage 28 can be configured to resist, impede, or minimize deformation that could be caused by a load or kinetic energy input into the roll cage 28. The roll cage 28 can be configured with any shape and contour that can be advantageous to mate the structural performance with aesthetic appeal desired for the vehicle 10. The roll cage 28 can be formed from any appropriate number of structural elements, from one to any number greater than one.

The roll cage 28 can include a plurality of cage members 32. The cage members 32 can include cage cross members 35, 36, and 37 and a plurality of cage side members 41, 42, 43, 44 and 45. The right side of the roll cage 28 can be mirror image to the left side of the roll cage 28. Each of the cage members can be configured as a hollow tube having a substantially circular or oval cross-section shape. The cage members 32 can be configured with any appropriate elongated shape that can provide the desired dimensionality of the passenger area and advantageously conform to the aesthetic appearance desired for the vehicle 10. For example, the cage members can be made from one or more lengths of a metal tube. Any one of the tubular cage members can be bent in one or more locations into a predetermined shape.

Each of the first cage side members 41 can be referred to as an A-pillar. Each of the first cage side members 41 can be connected at one end to a respective longitudinal members of the frame assembly 18 adjacent the front end of the respective one of the longitudinal members. Each of the first cage side members 41 can extend along each of the vertical direction V, the transverse direction T and the longitudinal direction L of the vehicle 10.

As shown in FIG. 1, the roll cage 28 can also include fourth cage side members 44. Each of the fourth cage side members 44 can be referred to as a roof rail or a top rail. Each of the fourth cage side members 44 can extend from and connect to a respective one of the first cage side members 41. Each of the fourth cage side members 44 can connect to a respective one of the third cage side members 43. Each of the fourth cage side members 44 can connect to a respective one of second cage side members 42. Each of the fourth cage side members 44 can connect to a respective one of the fifth cage side members 45. Each of the fourth cage side members 44 can extend along at least the longitudinal direction L of the vehicle 10.

The first cage cross member 35 can be connected to either the first cage side members 41 or the fourth cage side members 44 at a location that is adjacent to or at the junction of the first cage side members 41 and the fourth cage side members 44. Alternatively, the first cage cross member 35 can be connected at the junction of the first cage side members 41 and the fourth cage side members 44.

Each of second cage side members 42 can be referred to as a B-pillar. Each of the second cage side members 42 can be connected at a first end to a respective longitudinal member of the frame assembly 18. Each of the second cage side members 42 can be connected at a second end to a respective one of the fourth cage side members 44. The second cage cross member 36 can be connected to either the fourth cage side members 44, or the second cage side members 42, or a location that is adjacent to or at the junction of the fourth cage side members 44 and the second cage side members 42.

Each of third cage side members 43 can be referred to as a C-pillar. Each of the third cage side members 43 can be connected at a first end to a respective longitudinal members. Each of the third cage side members 43 can be connected at a second end to either a respective one of the fourth cage side members 44 or a respective one of fifth cage side members 45 at a location that is adjacent to or at a junction of the respective one of the fourth cage side members 44 and the respective one of the fifth cage side members 45. Alternatively, each of the third cage side members 43 can be connected at the second end to the junction of the respective one of the fourth cage side members 44 and the respective one of the fifth cage side members 45.

The third cage cross member 37 can be connected to either the fourth cage side members 44, or the third cage side members 43, or the fifth cage side members 45, or alternatively, at a location that is adjacent to or at the junction of the fourth cage side members 44, or the third cage side members 43, or the fifth cage side members 45.

Each of the fifth cage side members 45 can be connected to and extend away from a respective one of the fourth cage side members 44 along the longitudinal direction L of the vehicle 10.

The cage cross members 35, 36, 37, can extend in the transverse direction T of the vehicle 10 from the left side of the roll cage 28 to the right side of the roll cage 28. The cage cross members 35, 36, 37 can define limits of the passenger area 29 in the longitudinal direction L of the vehicle 10 and the vertical direction V of the vehicle 10. The cage cross members 35, 36, 37 can be connected to a respective left-side and right-side pair of the cage side members 41, 42, 43, 44, 45 by welding.

Figure 10:
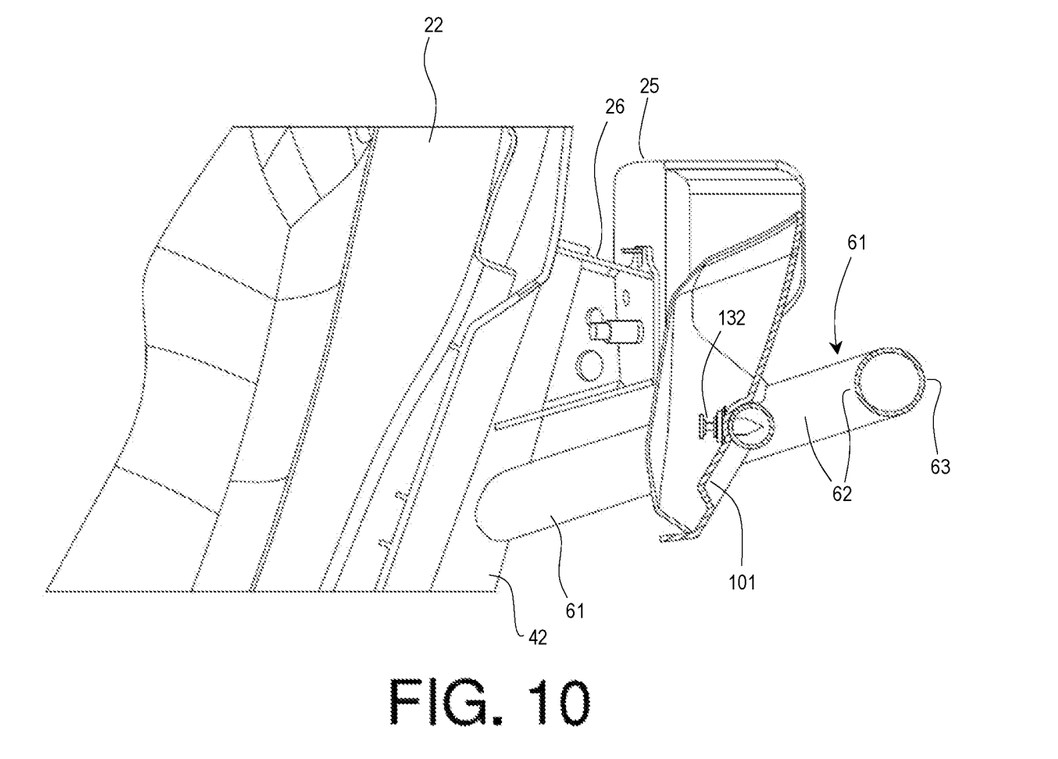
FIG. 10 is cross-sectional view along line 10-10 of FIG. 3 in accordance with principles of the disclosure.

The vehicle 10 can include restraining mechanisms such as seatbelts. Referring to FIG. 10, a seatbelt or a portion of the seatbelt can be stowed in a seat belt retractor 25. The seat belt retractor 25 can include a coiling mechanism upon which the seatbelt is wound. The seat belt retractor 25 can be mounted to the frame assembly 18 by a support 26. For example, the support 26 can be a bracket or flange that connects the seat belt retractor 25 to the second cage side member 42.

A vehicle in accordance with principles of the disclosure can include one or more grab bars. A grab bar can be attached to the frame of the vehicle and extend from a left side of the vehicle to a right side of the vehicle. A grab bar can be useful with various types of travel. Travel along an unimproved path, which can include an off-road trail, for example, can result in substantial jostling of passengers in the vehicle. A grab bar can be useful when the vehicle is driven on such an unimproved path. For example, a grab bar can assist with stability of passengers in conjunction with turning or sudden maneuvering of a vehicle. That is, a purpose of such a grab bar can be to provide structure for a passenger to hold or grab onto during travel of the vehicle. As a result, a passenger can brace herself or himself to better withstand jostling of the vehicle or turning of the vehicle.

With further reference to FIG. 1, the vehicle 10 can include a vehicle assembly 50. The vehicle assembly 50 can include the vehicle body structure 17, a front seat 22, a rear seat 23, and a grab bar assembly 60. The vehicle body structure 17 can include the frame assembly 18 and one or more panel structures 19, as described above. The frame assembly 18 or the panel structures 19 can support the front and rear seats 22, 23. The vehicle body structure 17 can define a passenger area 29, as described above.

Figure 2:
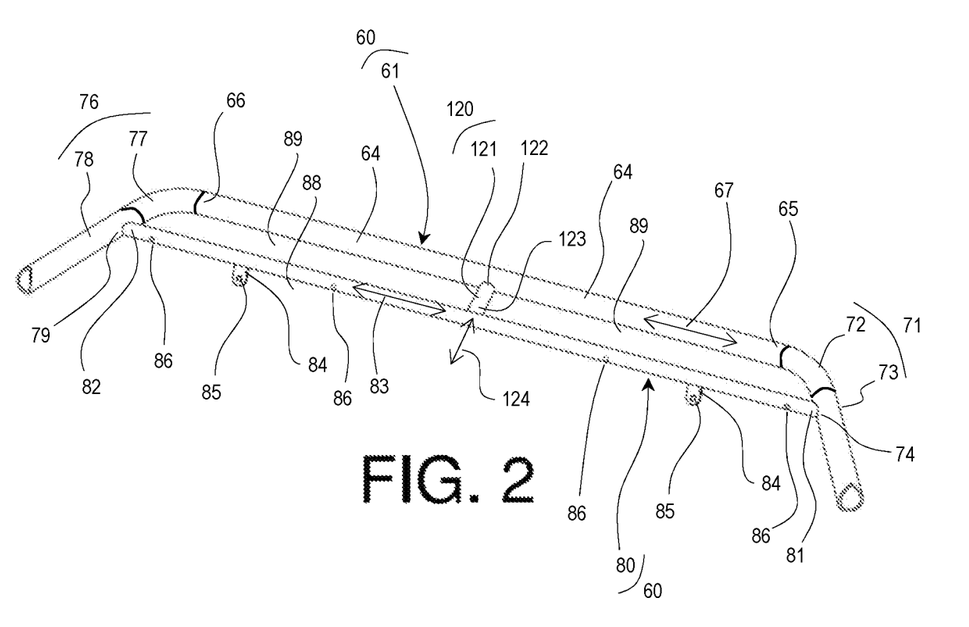
FIG. 2 is a front perspective view of a grab bar assembly in accordance with principles of the disclosure.

The grab bar assembly 60 can be mounted to the vehicle body structure 17. In particular, the grab bar assembly 60 can be mounted to the frame assembly 18 or roll cage 28 of the vehicle 10. The grab bar assembly 60 can include a grab bar 61, a spacer bar 80, and a cover assembly 90. The grab bar 61 can extend across the passenger area 29. The spacer bar 80 can be attached to the grab bar 61. Referring to FIG. 2, as a result of positioning of the spacer bar 80 between the grab bar 61 and the front seat 22, a first gap 88 can be provided between the spacer bar 80 and the front seat 22. A second gap 89 can be provided between the spacer bar 80 and the grab bar 61. Referring to FIG. 1, the cover assembly 90 can be attached to the spacer bar 80. The cover assembly 90 can be positioned in the first gap 88. Accordingly, the cover assembly 90 can be positioned between the spacer bar 80 and the front seat 22. The cover assembly 90 can effectively preclude or obstruct access to the first gap 88.

As further described below, the grab bar assembly 60 can be provided to prevent the front seat 22 from pinching a rear passenger's hand while holding the grab bar 61. The spacer bar 80, which can be characterized as a secondary bar 80, can be attached to the main grab bar or grab bar 61 to prevent the front seat 22 from pitching the rear passenger's hands during operation of the vehicle. The cover assembly 90, which can be constructed of plastic, can be placed over or attached to the secondary bar or spacer bar 80 to prevent the rear passenger from grabbing such location, i.e. from positioning their hands in the first gap 88 and pinching their hands. Accordingly, the grab bar assembly 60 can provide an arrangement that can reduce the risk of pinching the fingers of a rear passenger while grasping the grab bar 61.

The spacer bar 80 and/or the cover assembly 90 can be characterized as a seat stopper that can be attached to a rear passenger grab bar of an all-terrain vehicle, for example. The spacer bar 80 can be configured as a wire form bar. Referring to FIGS. 2 and 10 collectively, the spacer bar 80 can be mounted to and protrude from a distal face or forward face 62 of the grab bar 61. The grab bar 61 can also include a rear or rearward face 63. The forward face 62 of the grab bar 61 can face in a forward direction of the vehicle 10. The spacer bar 80 can be attached to the forward face 62 of the grab bar 61. The rear face 63 of the grab bar 61 can face in a rearward direction of the vehicle 10.

Referring to FIG. 2, the grab bar 61 can include a center portion 64, a left side portion 71, and a right side portion 76. The center portion 64 can include a first end 65 and a second end 66. The center portion 64 can be straight in geometry and positioned along a first axis 67.

Figure 3:
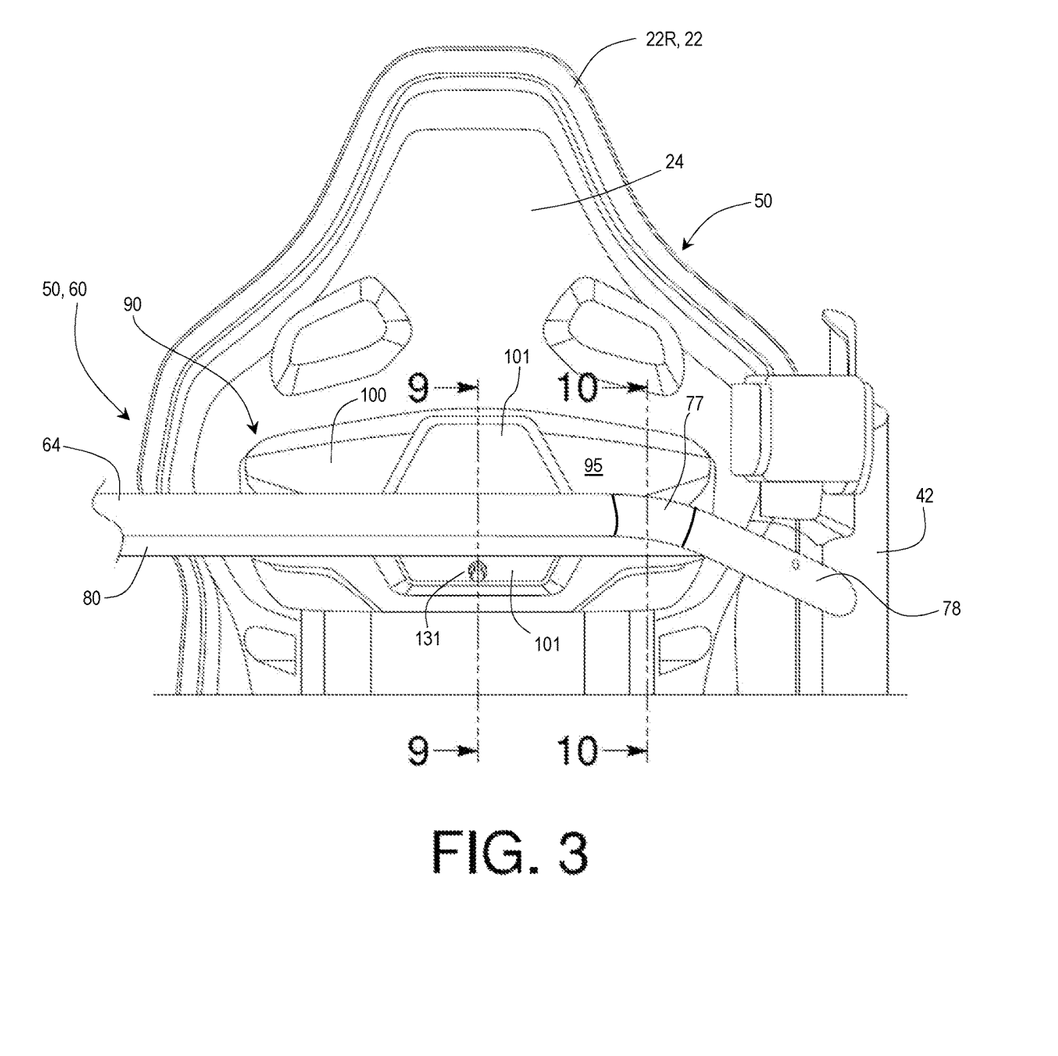
FIG. 3 is a rear view of a vehicle assembly in accordance with principles of the disclosure.

The left side portion 71 can include a first bend 72 and a first straight portion 73. The right side portion 76 can include a second bend 77 and a second straight portion 78. Referring to FIGS. 1-3 collectively, the first straight portion 73 can extend between the first bend 72 and the vehicle body structure 17. Accordingly, the first straight portion 73 can be attached to the vehicle body structure 17. For example, the first straight portion 73 can be attached to the second cage side member 42, on the driver-side of the vehicle, such as by welding or mechanical fastener. The second straight portion 78 can extend between the second bend 77 and the vehicle body structure 17. Accordingly, the second straight portion 78 can be attached to the vehicle body structure 17. For example, the second straight portion 78 can be attached to the second cage side member 42, on the passenger-side of the vehicle, such as by welding or mechanical fastener.

Accordingly, the structure of the grab bar 61 can include, from left to right relative to a passenger seated in the rear seat 23, the first straight portion 73, the first bend 72, the first bend 72 attached to the first end 65 (of the center portion 64), the second end 66 of the center portion 64 attached to the second bend 77, and the second bend 77 attached to the second straight portion 78. Such portions or segments of the grab bar 61 can be integrally formed with each other such that the grab bar 61 is a unitary homogenous component.

As shown in FIG. 2, the spacer bar 80 can be straight in geometry and positioned along a second axis 83. The second axis 83 can be substantially parallel to the first axis 67, along which the center portion 64 is positioned such that one skilled in the art could reasonably perceive the second axis 83 to be parallel to the first axis 67. The spacer bar 80 can include a first end 81 and a second end 82.

A body of the spacer bar 80 can extend between the first end 81 and the second and 82 in the straight or linear manner. The first end 81 can be attached to a first attachment location 74 on the first straight portion 73. However, the first end 81 can be attached at any location on the left side portion 71, including attached to the first bend 72. The second end 82 can be attached to a second attachment location 79 on the second straight portion 78. However, the second end 82 can be attached at any location on the right side portion 76, including attached to the second bend 77. The spacer bar 80 can be spaced from the grab bar 61 by the second gap 89. The second gap 89 can provide an opening for a passenger to wrap his or her fingers about the center portion 64, i.e., so as to grab onto the grab bar 61.

The grab bar assembly 60 can further include a support strut 120. The support strut 120 can extend between the grab bar 61 and the spacer bar 80. The support strut 120 can include a support strut body 121. The support strut body 121 can include a first end 122 and a second end 123. The first end 122 can be attached to the grab bar 61 and the second end 123 can be attached to the spacer bar 80. The support strut body 121 can extend between the ends 122, 123 in a straight or linear manner. Accordingly, the support strut 120 can be positioned about a third axis 124. The third axis 124 can be substantially perpendicular to the first axis 67 and the second axis 83, i.e. with the first axis 67 and the second axis 83 such that one skilled in the art could reasonably perceive the third axis 124 to be perpendicular to the first axis 67 and the second axis 83.

As described above, the grab bar assembly 60 can include a cover assembly 90. The cover assembly 90 can be attached to the spacer bar 80, so as to be positioned in the first gap 88. Accordingly, the cover assembly 90 can be positioned between the spacer bar 80 and the front seat 22. The cover assembly 90 can be placed over or attached to the spacer bar 80 to prevent the rear passenger from grabbing such location, i.e. from positioning their hands in the first gap 88 and pinching their hands coming back onto the grab bar assembly 60 during operation of the vehicle.

Figure 4:
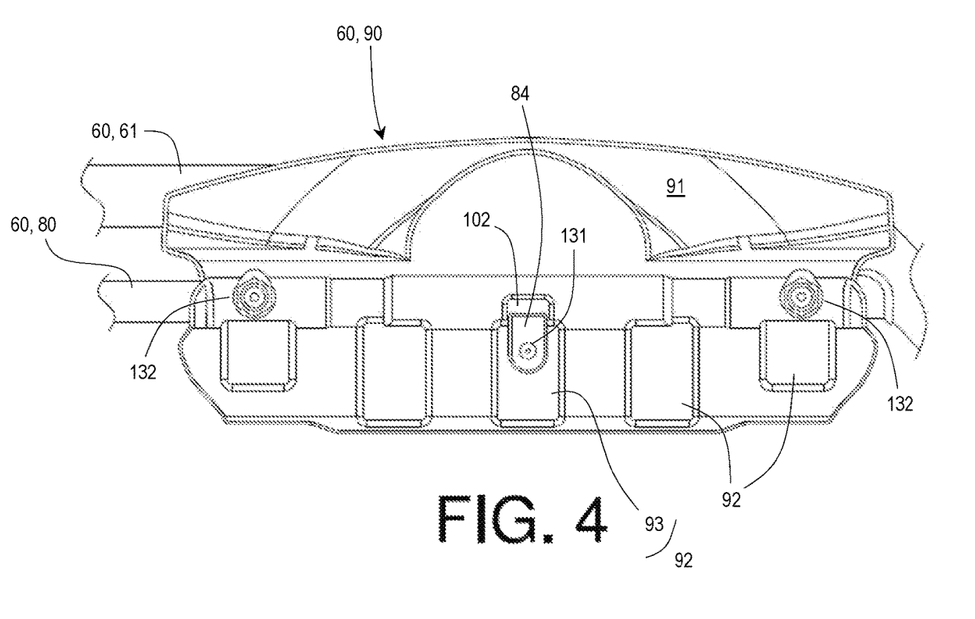
FIG. 4 is a front view of a cover assembly with grab bar and spacer bar in accordance with principles of the disclosure.
Figure 5:
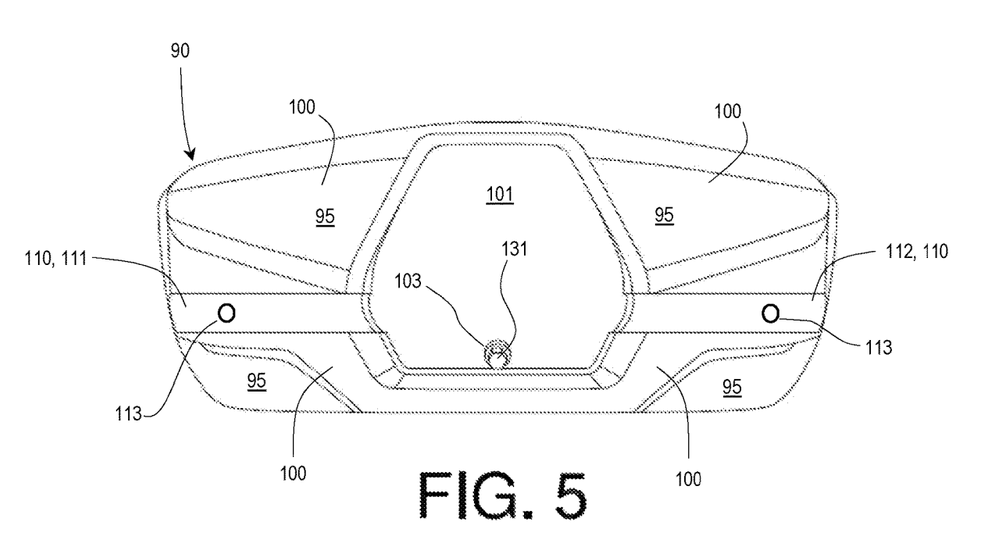
FIG. 5 is a rear view of a cover assembly in accordance with principles of the disclosure.

The cover assembly 90 can include a front side 91 (FIG. 4) and a rear side 95 (FIG. 5). The front side 91 can be provided with a plurality of vertical ridges or protuberances 92 that can provide structural strength to the cover assembly 90. The vertical ridges 92 can include a center ridge 93. The center ridge 93 can be attached to a support tab 84, of the spacer bar 80, as described further below.

As shown in FIG. 5, the rear side 95 of the cover assembly 90 can include a raised portion 100. The raised portion 100 can be curved in shape or include straight portions that are angled relative to each other so as to create a curved overall geometry. Such curved overall geometry can be complimentary to a curved geometry of the back of the front seat 22.

The cover assembly 90 can include at least one receiving groove 110. The at least one receiving groove 110 can receive therein the spacer bar 80. The at least one receiving groove 110 can be in the form of a curved geometry that can mate with an outer surface, i.e. an outer diameter, of the center portion 64 of the grab bar 61. Accordingly, the at least one receiving groove 110 can wrap around or be curved about a portion of the spacer bar 80. The at least one receiving groove 110 can include a first receiving groove 111 and a second receiving groove 112. The first receiving groove 111 and the second receiving groove 112 can engage with different segments of the spacer bar 80 along the length of the spacer bar 80. At an outboard edge or outboard portion thereof, the cover assembly 90 can also engage with the grab bar 61.

As described above, the cover assembly 90 can include a raised portion 100. A recessed portion 101 can be defined in or positioned in the raised portion 100. Additionally, the two receiving grooves 111, 112 can be defined in the raised portion 100, as described above. The two receiving grooves 111, 112 can be positioned on respective sides of the recessed portion 101. Depth of the recessed portion 101 (in the raised portion 100) can be the same or different as compared to the depth of the receiving grooves 111, 112 (in the raised portion 100).

Figure 9:
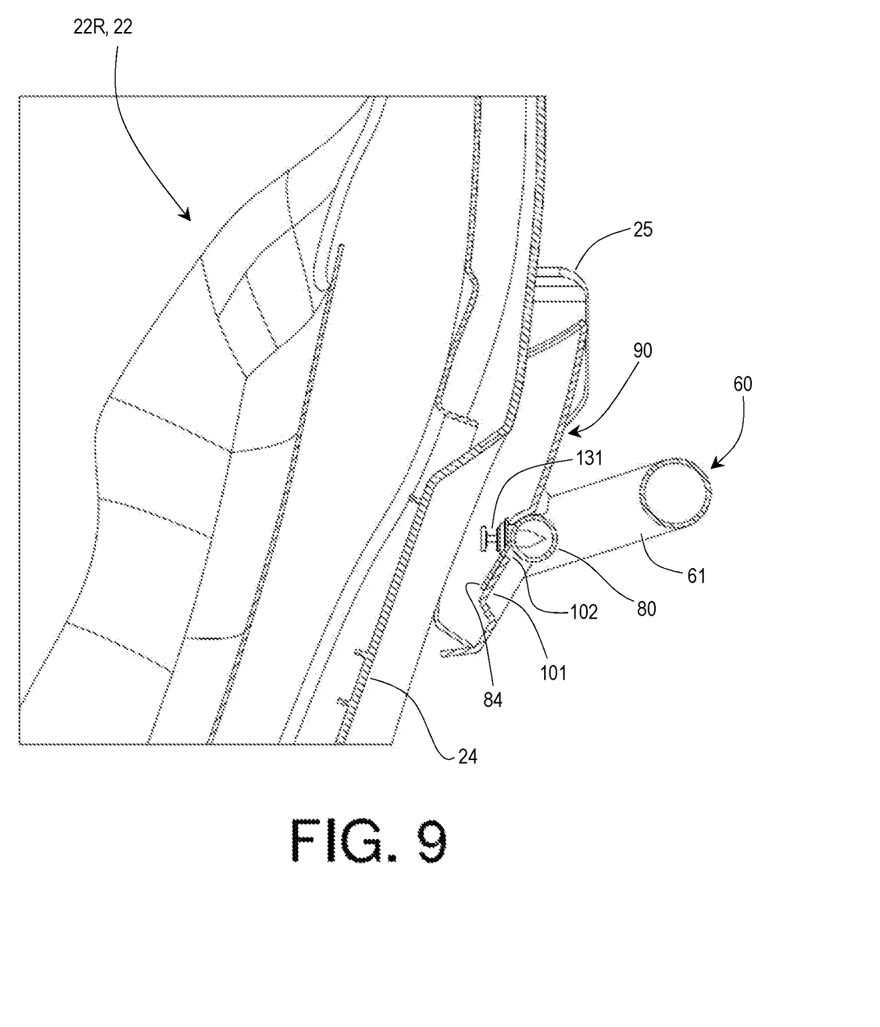
FIG. 9 is cross-sectional view along line 9-9 of FIG. 3 in accordance with principles of the disclosure.

The cover assembly 90 can be secured to the spacer bar 80 and/or the grab bar 61 utilizing suitable fasteners and/or brackets, for example. As shown in FIGS. 4, 9 and 10, the cover assembly 90 can be attached to the spacer bar 80 utilizing a support tab 84 and fastener elements 131, 132.

As shown in FIGS. 2 and 4, the spacer bar 80 can include a support tab 84. The support tab 84 can be welded or otherwise bonded to the spacer bar 80. The support tab 84 can serve to connect the cover assembly 90 the spacer bar 80. As illustrated, a respective support tab 84 can be provided with each cover assembly 90, i.e., with a respective cover assembly 90 each respectively positioned behind the front seats 22L, 22R.

The support tab 84 can extend downward from the spacer bar 80. Alternate embodiments can include a support tab 84 that extends upwardly from the spacer bar 80. The support tab 84 can include a tab aperture 85 for receiving a fastener element, i.e. a tab fastener 131. Referring to FIG. 5, the cover assembly 90 can include a first aperture 103. The tab fastener 131 can be configured to connect the tab aperture 85 to the first aperture 103 (of the cover assembly 90), i.e. so as to connect and secure the spacer bar 80 to the cover assembly 90. The tab fastener 131 can be any appropriate fastener such as but not limited a threaded mechanical fastener, a plastic resilient fastener, a rivet, etc. The resilient plastic fastener can include a shaft and one or more resilient rings spaced along the shaft that are smaller than the apertures 85, 103 and elastically deform as they pass through the apertures 85, 103.

Figure 6:
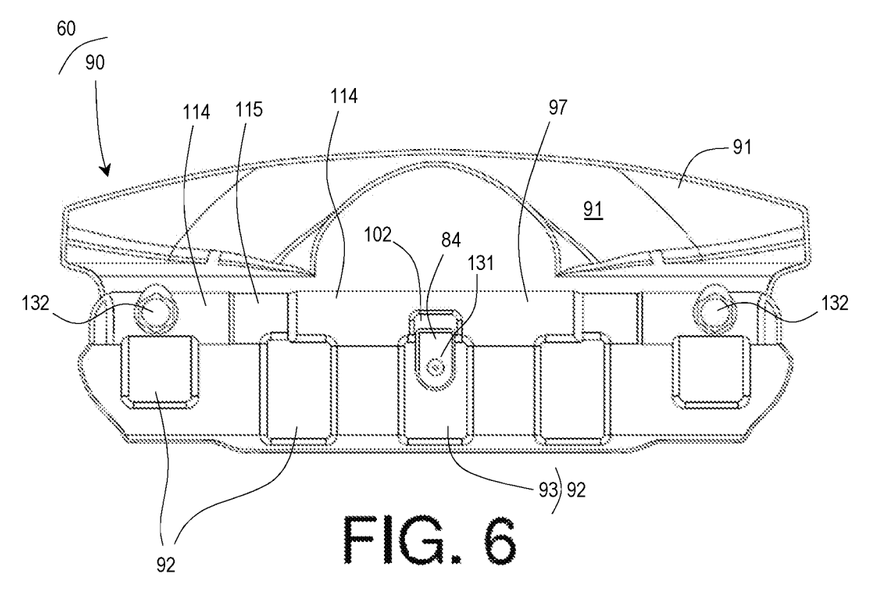
FIG. 6 is a front view of a cover assembly in accordance with principles of the disclosure.
Figure 7:
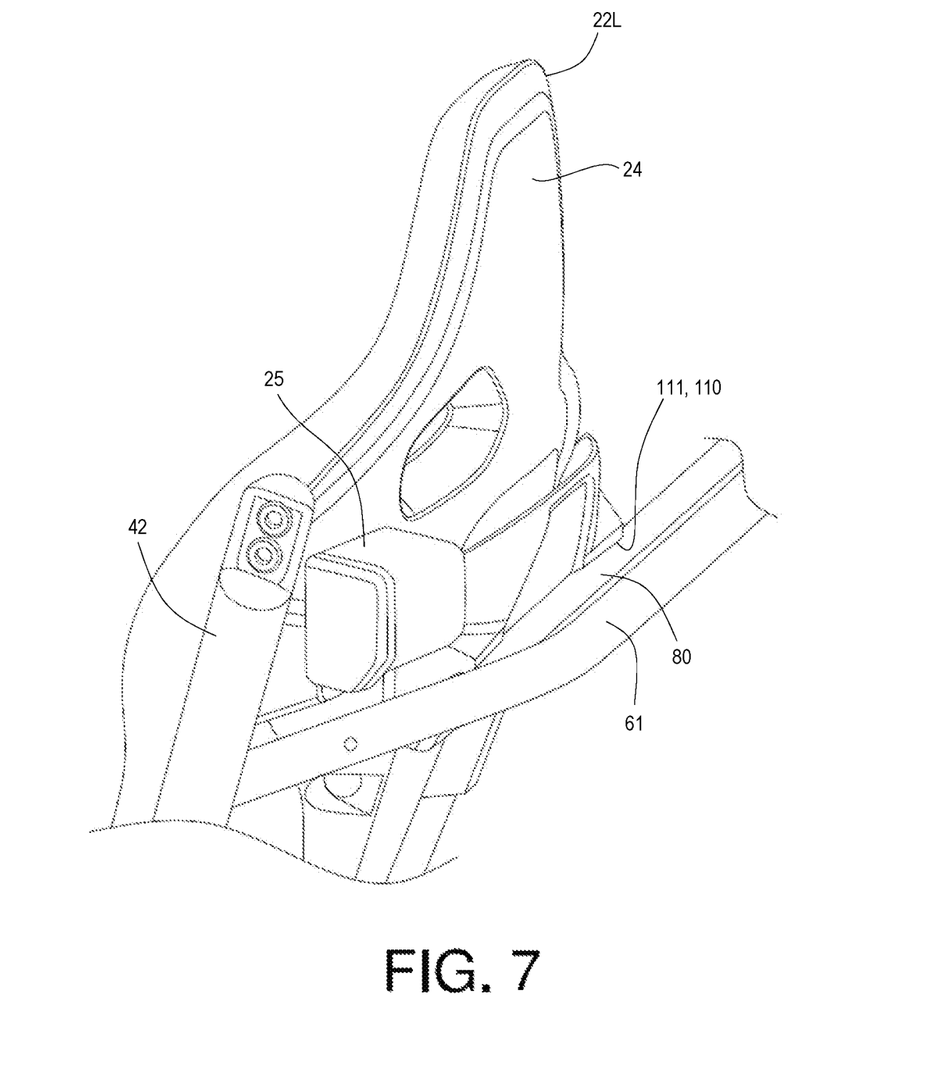
FIG. 7 is a rear perspective view of a vehicle assembly in accordance with principles of the disclosure.
Figure 8:
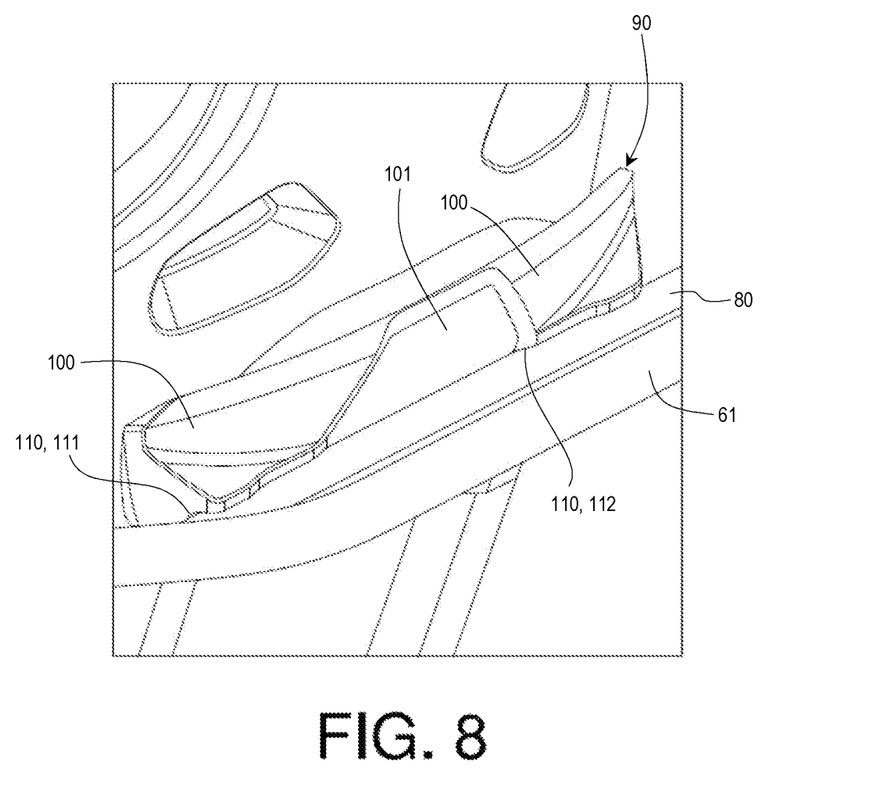
FIG. 8 is a further rear perspective view of a vehicle assembly in accordance with principles of the disclosure.

Geometry of the cover assembly 90 can be provided so as to mate with the support tab 84 in an assembled arrangement of the grab bar assembly 60. As shown in FIGS. 4 and 6, the cover assembly 90 can include a tab receiving hole or aperture 102. The support tab 84 can extend from the spacer bar 80 through the tab receiving hole 102 and attach onto the cover assembly 90 on the front side 91 of the cover assembly 90. In particular, as described above, the support tab 84 can be mounted onto and secured to the center ridge 93 of the vertical ridges 92.

Referring to FIG. 2, the spacer bar 80 can also include side apertures 86. The side apertures 86 can be respectively positioned on opposing sides of the support tab 84. Referring to FIG. 5, the cover assembly 90 can include second apertures 113. In an assembled arrangement, each side aperture 86 can be respectively aligned with a second aperture 113 (in the cover assembly 90). A secondary fastener 132 can pass through a respective side aperture 86 and second aperture 113 so as to secure the cover assembly 90 on to the spacer bar 80. The secondary fastener 132 can be any appropriate fastener such as but not limited a threaded mechanical fastener, a plastic resilient fastener, a rivet, etc., described above with respect to the tab fastener 131.

As shown in FIG. 6, the front side 91 of the cover assembly 90 can include a transverse ridge 97. The transverse ridge 97 can be defined by and/or constitute an opposite side of the cover assembly from the receiving groove 110. Accordingly, a curvature of the transverse ridge 97 can correspond to a negative curvature of the receiving groove 110. The transverse ridge 97 can include alternating bands of thickness portions. First thickness portions 114 can be thicker, in thickness of material, as compared to a thickness of a second thickness portion 115. In accordance with at least one embodiment, the thicker portions of material can be provided at locations or areas at which the cover assembly 90 is fastened to the spacer bar 80. That is, a thickness of the cover assembly 90 in an area surrounding and including the second apertures 113 can be larger than a thickness of other portions of the cover assembly 90. Accordingly, such arrangement can provide further structural strength to the cover assembly 90.

While certain embodiments of the invention are described above, it should be understood that the invention can be embodied and configured in many different ways without departing from the spirit and scope of the invention.

Various components of embodiments of the disclosure can be made from any of a variety of materials including, for example, steel, metal, plastic, plastic resin, nylon, composite material, and/or rubber, for example, or any other material as may be desired.

Features, elements and/or characteristics described with respect to one embodiment of the disclosure may be variously used with other embodiments of the disclosure as may be desired.

A variety of production techniques can be used to make the apparatuses as described herein. For example, suitable casting and/or injection molding and other molding techniques, extrusion and other manufacturing techniques can be utilized. Also, metal stamping or cutting can be utilized. For example, metal stamping or cutting, as well as bending, can be utilized in construction of the cutter deck or the plates.

In general, the cover assembly 90 can be dimensioned and of geometrical shape to both mate with the spacer bar 80 and/or the grab bar 61 and to conform with the front seat back 24. Any number of fasteners, brackets, or other attachment mechanisms can be utilized to attach the cover assembly 90 to the spacer bar 80 and/or the grab bar 61.

While a respective illustrative cover assembly 90 has been described as positioned behind each of the front seats 22L, 22R, the disclosure is not limited to such particulars. More than one cover assembly 90 can be positioned behind a particular seat. Further, there may be more than two rows of seats in a vehicle. With such arrangement, a cover assembly 90 can be positioned behind each seat in the second row of seats, so as to afford a grab bar of the disclosure to passengers in the third row of seats. Additional cover assemblies can be provided for additional rows of seats.

For example, the grab bar 61 described above can be a unitary homogenous bar. However, alternate embodiments can include a grab bar that is formed in pieces and fastened together in some manner. For example, ends of the first bend 72 can be reduced in diameter so as to be respectively received into the center portion 64 and the first straight portion 73. For example, ends of the second bend 77 can be reduced in diameter so as to be respectively received into the center portion 64 and the second straight portion 78. Other telescopic or other mating relationships may be utilized so as to connect the different portions or segments of the grab bar 61. For example, a reduced diameter rod might be provided, and received into adjoining members or segments of the grab bar 61 so as to connect such adjoining members or segments. Such adjoining members or segments, and the reduced diameter rod might then be bonded together such as by welding.

The grab bar 61 described above can extend across the vehicle 10 along the transverse direction of the vehicle 10. Alternative embodiment can include a pair of grab bars that extends from a respective one of the second cage side members 42 to an interim location, such as halfway or approximately halfway across the vehicle 10. In this alternate embodiment, the pair of grab bars 61 can be mirror images of each other. With such two grab bars 61, each grab bar can be connected to a second cage side member 42 and be connected to a central structural member. The central structural member might extend from a floor of the vehicle 10, for example.

Embodiments are disclosed above in which the cover assembly 90 or portions thereof is constructed of a single or unitary piece. However, embodiments are intended to include or otherwise cover a cover assembly 90 that includes or is constructed of multiple pieces. For example, the multiple pieces of cover assembly 90 can be injection molded in pieces and then connected together such as by heat bonding or adhesive, for example.

For example, embodiments are disclosed above in which the cover assembly 90, grab bar 61 and spacer bar 80 include a specific shape, geometry, or construction. It is appreciated that shape and structure of components described herein may vary between different types of vehicles. Accordingly, exemplary embodiments are also intended to include other assemblies that include variations in shape, geometry, or construction as dependent on shape of the seat and/or frame assembly of a particular vehicle, for example.

What is claimed is:

1. A vehicle assembly for a vehicle, the vehicle assembly comprising:
   a vehicle body structure that defines a passenger area;
   a front seat mounted to the vehicle body structure;
   a rear seat mounted to the vehicle body structure; and
   a grab bar assembly mounted to the vehicle body structure, and the grab bar assembly including:
      a grab bar that extends across the passenger area;
      a spacer bar that is attached to the grab bar, with a first gap formed between the spacer bar and the front seat, and a second gap formed between the spacer bar and the grab bar; and
      a cover assembly that is attached to the spacer bar, the cover assembly positioned in the first gap.

2. The vehicle assembly of claim 1, wherein the grab bar includes:
   a left side portion that includes a first bend,
   a right side portion that includes a second bend, and
   a center portion that extends between the first bend and the second bend.

3. The vehicle assembly of claim 2, wherein the spacer bar includes a first end and a second end, the first end is attached to the left side portion, and the second end is attached to the right side portion.

4. The vehicle assembly of claim 2, wherein
   the center portion extends along a first axis, the spacer bar extends along a second axis, and the first axis is substantially parallel to the second axis, and
   the grab bar includes a support strut that extends between the spacer bar and the grab bar, and the support strut positioned along a third axis that is substantially perpendicular to both the first axis and the second axis.

5. The vehicle assembly of claim 2, wherein the left side portion further includes a first straight portion that extends from the first bend, and the first straight portion is attached to the vehicle body structure; and
   the right side portion further includes a second straight portion that extends from the second bend, and the second straight portion is attached to the vehicle body structure.

6. The vehicle assembly of claim 1, wherein the vehicle body structure includes a frame, and the frame includes a plurality of tubular structures that define the passenger area.

7. The vehicle assembly of claim 1, wherein the grab bar includes a forward face that faces the front seat, and the spacer bar is attached to a forward face of the grab bar.

8. The vehicle assembly of claim 1, wherein the cover assembly includes at least one receiving groove, and the at least one receiving groove receives the spacer bar.

9. The vehicle assembly of claim 8, wherein the cover assembly further includes,
   a raised portion and a recessed portion, and the recessed portion is defined in the raised portion, and
   a pair of receiving grooves, which are each positioned on respective sides of the recessed portion, and the two receiving grooves are defined in the raised portion.

10. The vehicle assembly of claim 9, further comprising at least one fastener element connecting the cover assembly to the spacer bar.

11. The vehicle assembly of claim 1, further comprising a tab fastener and a plurality of secondary fasteners, wherein
   the spacer bar includes a support tab that includes a tab aperture,
   the cover assembly includes a first aperture,
   the tab fastener connects the tab aperture to the first aperture, so as to connect the spacer bar to the cover assembly; and
   the spacer bar further includes side apertures on opposing sides of the support tab,
   the cover assembly further includes second apertures, and
   the plurality of secondary fasteners that each serve to connect a respective one of the side apertures to a respective one of the second apertures.

12. The vehicle assembly of claim 1, wherein
   the cover assembly includes a front side and a rear side,
   the front side includes a plurality of vertical ridges, and the front side is curved to match with a back of the front seat; and
   the rear side includes at least one receiving groove, the at least one receiving groove receiving the spacer bar, and
   the at least one receiving groove possessing first thickness portions interleaved with second thickness portions, and the first thickness portions being of thicker construct than the second thickness portions.

13. The vehicle assembly of claim 1, wherein the grab bar extends in a transverse direction of the vehicle assembly from a first side of the frame assembly to a second side of the frame assembly.

14. A vehicle assembly for a vehicle, the vehicle assembly comprising:
   a vehicle body structure that defines a passenger area;
   a front seat mounted to the vehicle body structure;
   a rear seat mounted to the vehicle body structure; and
   a grab bar assembly mounted to the vehicle body structure, and the grab bar assembly including:
      a grab bar that extends across the passenger area;
      a spacer bar that is attached to the grab bar, with a first gap formed between the spacer bar and the front seat, and a second gap formed between the spacer bar and the grab bar; and
      a cover assembly that is attached to the spacer bar, the cover assembly positioned in the first gap, the cover assembly includes at least one receiving groove and a plurality of fasteners, the at least one receiving groove receiving the spacer bar, and a plurality of fasteners attaching the cover assembly to the spacer bar.

15. The vehicle assembly of claim 14, wherein the cover assembly is constructed of plastic.

16. The vehicle assembly of claim 14, wherein the grab bar includes:
   a left side portion that includes a first bend,
   a right side portion that includes a second bend, and
   a center portion that extends between the first bend and the second bend.

17. The vehicle assembly of claim 16, wherein the spacer bar includes a first end and a second end, the first end is attached to the left side portion, and the second end is attached to the right side portion.

18. A vehicle comprising:
- a vehicle body structure that defines a passenger area;
- a front seat mounted to the vehicle body structure;
- a rear seat mounted to the vehicle body structure;
- a grab bar assembly mounted to the vehicle body structure, and the grab bar assembly including:
  - a grab bar that extends across the passenger area;
  - a spacer bar that is attached to the grab bar, with a first gap formed between the spacer bar and the front seat, and a second gap formed between the spacer bar and the grab bar; and
  - a cover assembly that is attached to the spacer bar, the cover assembly positioned in the first gap so as to be positioned between the front seat and the spacer bar; and
- a plurality of wheels connected to the vehicle body structure.

19. The vehicle of claim 18, wherein the vehicle body structure includes a frame assembly, and the grab bar extends in a transverse direction of the vehicle from a first side of the frame assembly to a second side of the frame assembly.

20. The vehicle of claim 18, wherein the grab bar includes:
- a left side portion with a first bend and a right side portion with a second bend, and
- a center portion that extends between the first bend and the second bend; and
- the spacer bar includes a first end and a second end, the first end attached to the left side portion, and the second end attached to the right side portion.

* * * * *